(12) United States Patent
Fronius et al.

(10) Patent No.: US 10,376,964 B2
(45) Date of Patent: Aug. 13, 2019

(54) TOOL RECEPTACLE WITH DAMPING ELEMENT

(71) Applicant: Bilz Werkzeugfabrik GmbH & Co. KG, Ostfildern (DE)

(72) Inventors: Juergen Fronius, Walheim (DE); Attilio Mandarello, Affalterbach (DE); Werner Schneider, Altbach (DE)

(73) Assignee: Bilz Werkzeugfabrik GmbH & Co. KG, Ostfildern (DE)

( * ) Notice: Subject to any disclaimer, the term of this patent is extended or adjusted under 35 U.S.C. 154(b) by 0 days.

(21) Appl. No.: 15/585,572

(22) Filed: May 3, 2017

(65) Prior Publication Data

US 2017/0239733 A1    Aug. 24, 2017

Related U.S. Application Data

(63) Continuation of application No. PCT/EP2015/074580, filed on Oct. 23, 2015.

(30) Foreign Application Priority Data

Nov. 12, 2014   (DE) .................... 20 2014 105 440 U (51) Int. Cl.
*B23B 31/02* (2006.01)
*B23B 31/117* (2006.01)
(Continued)

(52) U.S. Cl.
CPC .......... *B23B 31/1179* (2013.01); *B23B 31/02* (2013.01); *B23B 27/002* (2013.01);
(Continued)

(58) Field of Classification Search
CPC ... B23B 31/1179; B23B 27/002; B23B 27/24; B23B 2228/16; B23B 2250/12;
(Continued)

(56) References Cited

U.S. PATENT DOCUMENTS 2,547,522 A    4/1951  Eichelman
2,570,752 A   10/1951  Benjamin
(Continued)

FOREIGN PATENT DOCUMENTS

DE    102004024745 A1   12/2005
DE    102004054550 A1    5/2006
(Continued)

OTHER PUBLICATIONS

Machine Translation, WO 2007042020, Matheis, K. (Year: 2007).*
(Continued)

*Primary Examiner* — Eric A Gates
*Assistant Examiner* — Chwen-Wei Su
(74) *Attorney, Agent, or Firm* — Shuttleworth & Ingersoll, PLC; Jason Sytsma (57) ABSTRACT

A tool holder is provided comprising a base body for coupling with a drive spindle that can be driven rotatingly, whereon a clamping chuck for clamping a tool is provided, further comprising a damping element arranged between the base body and the clamping chuck, wherein the damping element is made of an elastomeric material or of a shape memory alloy, and wherein the clamping chuck is solely connected to the base body by means of the damping element.

11 Claims, 4 Drawing Sheets

(51) Int. Cl.
    *B23B 27/00* (2006.01)
    *B23B 31/08* (2006.01)
(52) U.S. Cl.
    CPC .......... *B23B 31/08* (2013.01); *B23B 2226/33* (2013.01); *B23B 2228/16* (2013.01); *B23B 2231/24* (2013.01); *B23B 2240/24* (2013.01); *B23B 2250/12* (2013.01); *B23B 2250/16* (2013.01); *B23B 2270/06* (2013.01); *Y10T 279/17111* (2015.01); *Y10T 279/17965* (2015.01); *Y10T 408/76* (2015.01); *Y10T 409/304312* (2015.01)
(58) Field of Classification Search
    CPC .......... B23B 2250/16; B23B 2240/24; B23B 2270/06; Y10T 279/17965; Y10T 279/17111; Y10T 279/17957; Y10T 408/76; Y10T 409/304312
    See application file for complete search history.

(56) References Cited

U.S. PATENT DOCUMENTS

| | | | |
|---|---|---|---|
| 2,767,564 A | 10/1956 | Green | |
| 3,242,791 A * | 3/1966 | Smith | B23B 29/022 188/379 |
| 4,288,058 A | 9/1981 | Inman | |
| 6,071,219 A | 6/2000 | Cook | |
| 6,082,236 A | 7/2000 | Andreassen | |
| 8,579,562 B2 * | 11/2013 | Haimer | B23B 29/12 279/102 |
| 9,878,375 B2 * | 1/2018 | Haimer | B23B 31/1179 |
| 2005/0019124 A1 * | 1/2005 | Rivin | B23B 31/006 409/234 |
| 2008/0290613 A1 | 11/2008 | Haimer | |
| 2009/0003947 A1 * | 1/2009 | Haimer | B23B 29/12 408/143 |
| 2009/0311061 A1 | 12/2009 | Santamarina et al. | |
| 2013/0230361 A1 * | 9/2013 | Stagge | B23B 31/005 409/234 |
| 2013/0300071 A1 * | 11/2013 | Teusch | B23B 31/028 279/9.1 |
| 2016/0008892 A1 | 1/2016 | Haimer | |
| 2016/0193666 A1 | 7/2016 | Haimer | |
| 2016/0199918 A1 | 7/2016 | Langbein et al. | |
| 2017/0232566 A1 * | 8/2017 | Babel | B23Q 11/1023 279/20 |

FOREIGN PATENT DOCUMENTS

| | | | |
|---|---|---|---|
| DE | 102005043626 A1 | 3/2007 | |
| DE | 202009010626 | 10/2009 | |
| DE | 202013008019 | 9/2013 | |
| DE | 102013103168 B3 | 4/2014 | |
| DE | 102013101854 A1 | 8/2014 | |
| EP | 1266710 | 12/2002 | |
| GB | 2230306 | 10/1990 | |
| JP | H05228707 | 9/1993 | |
| JP | H0617864 A | 1/1994 | |
| JP | 2001509438 A | 7/2001 | |
| JP | WO 0176814 A1 * | 10/2001 | .......... B23B 31/006 |
| JP | WO 2009101987 A1 * | 2/2009 | |
| WO | WO-2007042020 A2 * | 4/2007 | .......... B23B 31/028 |

OTHER PUBLICATIONS

International Search Report dated Apr. 11, 2016 for counterpart Application No. PCT/EP2015/074580.
Partial Search Report dated Jan. 21, 2016 for counterpart Application No. PCT/EP2015/074580.
German Search Report dated Mar. 2, 2016 for counterpart German Application No. DE 20 2014 105 440.5.
Japanese Office Action dated May 14, 2019 for counterpart Japanese Patent Application No. 2017-526575.

* cited by examiner

TOOL RECEPTACLE WITH DAMPING ELEMENT

CROSS-REFERENCE TO RELATED APPLICATIONS

This application is a continuation of international patent application PCT/EP2015/074580, filed on Oct. 23, 2015 designating the U.S.A., which international patent application has been published in German language and claims priority from German utility model application 20 2014 105 440.5, filed on Nov. 12, 2014. The entire contents of these applications are incorporated herein by reference.

BACKGROUND OF THE INVENTION

The invention relates to a tool receptacle comprising a base body for coupling with a rotatingly driven drive spindle whereon a clamping chuck for clamping a tool is received, further comprising a damping element between the base body and the clamping chuck being made of a material having a modulus of elasticity being different from the modulus of elasticity of the material whereof the clamping chuck is made, by an amount of at least 50%.

The invention further relates to a device and a method for producing such a tool receptacle.

When driving tool receptacles rotatingly a high rpms, such as with milling tools or boring tools, frequently oscillations result which may be detrimental to the work result and which also may influence the tool-life of the tools negatively.

Therefore numerous attempts were made to design tool receptacles having a decreased tendency for oscillations.

From DE 10 2013 101 854 A1 a tool receptacle is known wherein there is provided an annular damping element within a cavity provided between a base body of the tool receptacle and the clamping chuck connected therewith. The damping element has a small axial extension and preferably consists of a heavy metal and can be received axially biased within a cavity utilizing an intermediate layer of plastic material.

According to US 082 236 it is known with tool receptacles for turning machines to selectively introduce elastomeric elements into a cylindrical part of the tool receptacle for dampening individual vibration forms, such as a torsion about the longitudinal axis of the tool.

From DE 20 2009 010 626 U1 a tool receptacle comprising a damping ring equipped with elastic elements that is biased between the machine-side spindle interface and the counterpart of the spindle for dampening in this way substantially bending vibrations.

Although the known solutions may effect a certain vibration dampening in one or another kind, however, they are not sufficiently effective for various applications.

SUMMARY OF THE INVENTION

In view of this it is a first object of the invention to disclose a tool receptacle having improved vibration dampening characteristics.

It is a second object of the invention to disclose a tool receptacle having good true running characteristics while having improved vibration dampening characteristics.

It is a third object of the invention to disclose a device for making such a tool receptacle.

It is a forth object of the invention to disclose a method for making such a tool receptacle.

These and other objects according to one aspect of the invention are solved by a tool receptacle comprising:

a base body for coupling with a drive spindle that can be driven rotatingly;

a clamping chuck for clamping a tool; and a damping element made of an elastic material or of a shape memory alloy arranged between said base body and said clamping chuck, wherein said clamping chuck is solely connected to said base body by means of said damping element.

According to the invention the clamping chuck and the base body are fully decoupled from each other by means of the damping element, since apart from the damping element there is no connection between the clamping chuck and the base body.

This allows for an effective dampening of vibrations by means of the damping element.

The modulus of elasticity of the material of the damping element is considerably different from the modulus of elasticity of the material of which the base body and/or the clamping chuck are made. Preferably the modulus of elasticity of the damping element is of a non-linear characteristic, whereby a particularly effective dampening can be obtained in the desired range.

With the tool receptacle according to the invention independently of the load direction the load is directed via the elastic material, which is relatively soft when compared to the support base material, and is dampened in this way. Thus a reduction in the static stiffness of the tool receptacle results.

According to one aspect of the invention the damping element consists of an elastomeric material. Herein the damping element may for instance consist of a polyurethane material or of a rubber material.

With such elastomeric materials a particularly effective dampening of the tool receptacle can be reached, however, with still sufficient stiffness. In particular elastomeric materials on polyurethane basis (PUR) or on rubber basis ensure a sufficiently stiff connection between the clamping chuck and the tool receptacle and make possible a connection between the base body and the clamping chuck by material engagement having a sufficiently high precision so that true running defects are minimized.

According to another aspect of the invention the dampening element is made of a shape memory alloy.

Also with such a design a particularly effective vibration dampening can be obtained.

According to a further development of the invention the dampening element extends into an annular gap between a holding section of the clamping chuck and the base body.

In this way a continuous connection by material between the clamping chuck and the base body is ensured by means of the dampening element.

According to a further development of the invention the dampening element is shaped positively with the base body and the clamping chuck. To this end e.g. there may be provided protrusions, in particular by means of a multi-sided basic form of the dampening element.

Also in this way by means of the positive fit an effective transmission of the torque is ensured.

According to a further development of the invention at least at the base body or at the clamping chuck a threaded section is provided that allows a biasing of the clamping chuck with respect to the base body, preferably by means of a clamping nut.

In this way a bias between the base body and the clamping chuck can be obtained, for instance to ensure a particular damping characteristic.

To this end the threaded section may cooperate with a clamping nut, wherein an elastomeric disc is arranged between the clamping screw and the threaded section, the hardness of which is preferably selectable.

In this way the base body and the clamping chuck are decoupled from each other in both directions. By choosing the hardness of the elastomeric disc selectively, a selective bias can be set in both directions.

According to a further development of the invention the clamping chuck is configured as a thermal shrink-fit clamping chuck.

With such a design of the clamping chuck the present invention can be used particularly advantageous, since in this way a clamping of tool with high precision can be ensured even with small shaft diameter.

According to a further development of the invention at the base body as well as at the clamping chuck a centering flange is provided each, which is configured for centering the two parts with respect to each other by means of a surrounding form during molding and vulcanizing the damping element.

In this way a particularly good centering of the clamping chuck and the base body with respect to each other is ensured.

According to another aspect of the invention there is disclosed a device for producing a base body for coupling a clamping chuck for clamping a tool with a drive spindle that can be driven rotatingly, wherein a damping element made of an elastic material is arranged between said base body and said clamping chuck, said device comprising:

a mold comprising a recess for receiving said clamping chuck and said base body centered with respect to each other and secured against axial displacement, with a gap remaining between said clamping chuck and said base body;

at least one feed channel for feeding elastomeric material under pressure into said gap between said clamping chuck and said base body; and at least one exhaust channel arranged within said mold leading form said gap to the outside.

With such a device a precise positioning between the base body and the clamping chuck can be ensured when feeding elastomeric material under pressure and during vulcanizing so that a tool receptacle having a very good true running characteristic. Thus a high-precision relative positioning between the base body and the clamping chuck results.

According to a preferred development of this design a centering body for positioning is provided at an axial end of the clamping chuck which rests with its outer surface against an inner surface of the base body for effecting centering and comprising feeding channels to allow a feeding of elastomeric material under pressure into the gap.

By means of the centering body in this way in addition to the centering of the clamping chuck and the base body within a bore of the mold, an improved centering is made possible within the inner region so that a further improved precision results overall.

In a preferred development of this embodiment the centering body comprises an extension having male threads that can be screwed into female threads at the end of the clamping chuck.

In this way a direct engagement of the centering body at the clamping chuck is made possible to effect a good centering that can be easily released after vulcanizing the damping element.

According to a further embodiment of the invention at the centering body there is provided a pressure port for feeding elastomeric material via a pressure line through the base body.

By this feature a direct feeding of the elastomeric material under pressure into the centering body and from there via the feeding channels into the gap is ensured.

In a further development of the invention at the mold there are provided stops for an axial securing of the base body and the clamping chuck.

In this way a precise setting of the axial position of the base body and the clamping chuck with respect to each other is ensured when the elastomeric material is fed into the gap under pressure.

In a further preferred development of the invention the mold comprises an inner surface which is configured for a centering of the base body and the clamping chuck by means of centering trusses provided thereon.

In this way a very precise centering of the base body and the clamping chuck with respect to each other is made possible.

According to another aspect of the invention there is disclosed a method of making a tool receptacle, comprising a base body for coupling with a drive spindle that can be driven rotatingly, and a clamping chuck for clamping a tool, a continuous damping element made of a elastomeric material being arranged between said base body and said clamping chuck, said method comprising the following steps:

(a) providing a mold having a recess;

(b) inserting and centering said base body and said clamping chuck within said recess, thereby providing a continuous gap between said base body and a holding section of said clamping chuck;

(c) axially securing said base body and said clamping chuck within said mold;

(d) feeding elastomeric material under pressure into said gap between said base body and said holding section of said clamping chuck, until said gap is completely filled, while providing an exhaust through at least one exhaust channel provided within said mold;

(e) vulcanizing said elastomeric material; and (f) removing the tool receptacle from said mold.

By such a production a good linkage between the base body and the clamping chuck having a precise centering of the two parts with respect to each other is made possible.

Preferably herein a centering truss at the base body and the clamping chuck is used for centering the base body and the clamping chuck at the inner surface of the recess within the mold.

In this way a highly precise centering of the base body and the clamping chuck with respect to each other is ensured from the outside.

In a further preferred development of the method according to the invention between the base body and the axial end of the clamping chuck there is inserted a centering body by means of which the holding section is centered with an assigned inner surface of the base body, wherein the elastomeric material is fed into the gap through feeding channels within the centering body.

In this way in addition to the centering between the clamping chuck and the base body at an outer side there is ensured a centering within an inner region between the base body and the clamping chuck so that a further improved precision is ensured overall.

Herein the elastomeric material preferably can be fed within a pressure line that yields into the centering body and that can be secured there by screwing for instance by means of a thread.

Preferably a polyurethane or a rubber is utilized as elastomeric material.

Both materials allow for a high stiffness so that the tool receptacle can transmit sufficiently high torques without the damping element being too yielding. At the same time these materials have a high temperature resistance allowing also a utilization with a thermal shrink-fit chuck without the danger of a thermal overload of the damping element by means of the shrink-fit process.

Preferably the elastomeric material is fed with a pressure of at least 100 bars, preferably of at least 500 bars, and is vulcanized at a temperature of 100° C. to 280° C., preferably of 120° C. to 200° C.

Herein usually the vulcanizing is performed within a range of about 150° C. to 200° C., preferably at about 180° C.

During operation the damping element is sufficiently thermally resistant so that temperatures at the surface of the clamping chuck of about 180° C. can be tolerated permanently, wherein a short-time temperature increase up to about 200° C. is possible without any damage to the tool receptacle.

It will be understood that the afore mentioned features and the features of the invention to be described hereinafter cannot only be used in the respectively given combination, but also in different combinations or independently without leaving the scope of the invention.

BRIEF DESCRIPTION OF THE DRAWINGS

Further features and advantages of the invention can be taken from the subsequent description of preferred embodiments with reference to the drawings. In the drawings show.

DESCRIPTION OF PREFERRED EMBODIMENTS

Figure 1:
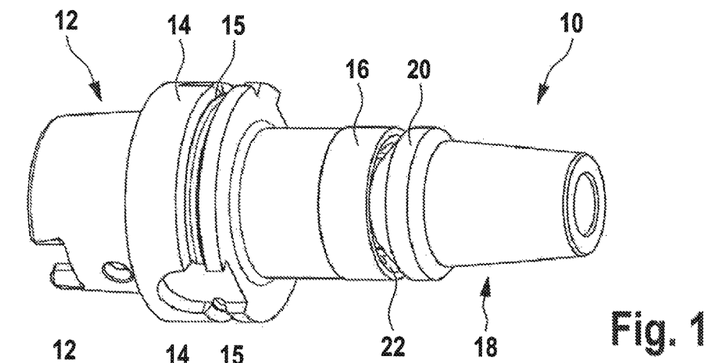
FIG. 1 a perspective representation of a tool receptacle according to the invention, however before inserting a damping element made of an elastomeric material into an annular gap between the clamping chuck and the base body.
Figure 2:
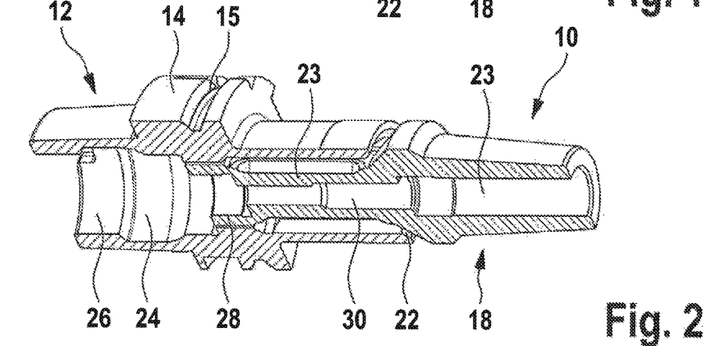
FIG. 2 a longitudinal section through the perspective representation according to FIG. 1.

In FIGS. 1 and 2 a tool receptacle according to the invention is shown in perspective or sectioned, respectively, and designated in total with numeral 10.

The tool receptacle 10 comprises a base body 12 in the known embodiment of the type HSK comprising a base body 12 for receiving a machine spindle, whereon a flange 14 including an annular groove 15 for handling by means of a tool changer or similar is provided.

In addition the tool receptacle 10 comprises a clamping chuck 18 configured as a thermal shrink-fit chuck, shown in FIGS. 1 and 2 with a gap 22 between the base body 12 and the clamping chuck 18 which later is filled by an elastic damping element. In FIGS. 1 and 2 the base body 12 and the clamping chuck 18 are depicted in their reference position with respect to each other, wherein a representation of the damping element filling the gap 22 between the base body 12 and the clamping chuck 18 was dispensed with.

The clamping chuck 18 comprises a holding section 23 into which a tool, e.g. a milling tool, can be shrinked in a known way, namely by widening the clamping chuck by local heating in the region of the holding section 23 at first, and by inserting the tool with its shaft thereafter, so that after cooling of the clamping chuck 18 the tool is held within the holding section 23 in shrink-fit. The clamping chuck 18 with a holding section 23 reaches into an assigned central bore of the base body 12, wherein an annular gap 22 between the holding section 23 and the inner surface of the base body 12 remains which to the outside runs out between a centering truss 16 at the outer end of the base body 12 and between an opposite centering truss 20 at the clamping chuck 18.

In a known manner the base body 12 comprises a central passage 24 having an inner cylindrical section 26. At an axial end of the holding section 23 an inner thread 28 is provided into which an assigned screw for a minimum quantity lubrication can be screwed for guiding coolant agent from there via a connecting coolant channel 30 directly to the end of the holding section 23 which is configured for receiving a tool. From there the coolant lubrication agent arrives via the tool shaft into the region of the working position.

Figure 3:
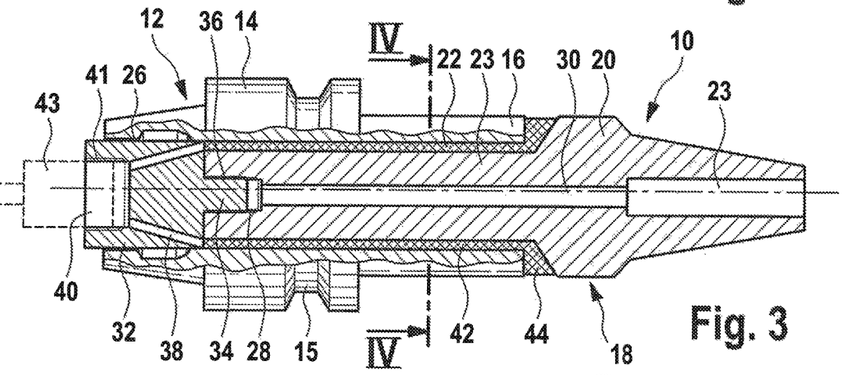
FIG. 3 a partially sectioned side elevation of the tool receptacle according to FIG. 1, wherein now in addition the damping element of elastomeric material is shown within the annular gap between the base body and the clamping chuck, as well as with a centering body at the axial end of the clamping chuck for further ensuring an additional centering within the inner region.

FIG. 3 shows a longitudinal section through the tool receptacle 10 according to the invention after generating by means of an injection molding process a damping element 42 which fills the gap 22 between the base body 12 and the clamping chuck 30.

The damping element 42 fills the gap 22 between the base body 12 and the clamping chuck 18 completely and thus ensures a connection between the base body 12 and the clamping chuck 18 by material engagement. The gap is configured as a continuous annular gap extending from the machine-side axial end of the holding section 23 initially in hollow cylindrical form until shortly before the centering truss 20, and running out at its end radially to the outside between the two centering trusses 16 and 20 so that there an outer region 44 is formed.

Apart from a centering body 32 being shown in addition in FIG. 3 which is screwed into the female thread 28 at the axial end of the holding section 23, the base body 12 and the clamping chuck 18 are only connected with each other by means of the damping element 42 which completely fills the annular gap 22.

Although the damping element 42 basically also may consist of a shape memory alloy, in the embodiment shown here it consists of an elastomeric material, in particular of polyurethane or of a rubber material.

By contrast to the prior art wherein always between the clamping chuck and the base body at some point there is a direct connection by means of welding or similar, according to the invention there is provided only a connection by means of the damping element 42. This preferably is configured as a material engagement, which however in addition uses a positive fit, as can be seen from the sectional representation according to FIG. 4.

Figure 4:
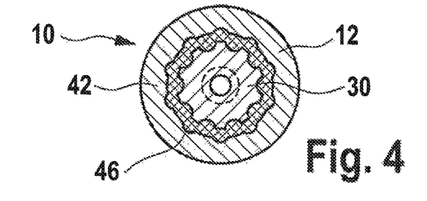
FIG. 4 a section through the tool receptacle according to FIG. 3 along the line IV-IV.

In the cross section the damping element 42 thus is not circular, but deviates from the circle shape, so that a positive fit results. For instance there may be provided protrusions 46 so that in total a multi-sided basic shape with rounded edges results. By a positive fit generated this way the torque transmission between the base body 12 and the clamping chuck 30 is improved.

As already mentioned above, in FIG. 3 at the machine-side axial end of the holding section 23 in addition there is shown a centering body 32.

This centering body 32 comprises an extension 34 which can be inserted with its male thread 36 into the female thread 28 at the end of the holding section. The centering body 32 allows for a precise centering between the holding section 23 and the base body 12, since the centering body 32 with its cylindrical outer perimeter engages into the inner cylindrical section 26 of the base body 12. The inner cylindrical section 26 to this end is closely tolerated, e.g. by grinding, to ensure in this way a precise positioning of the centering body 32 and thus of the end of the clamping chuck 18, since the centering body is screwed with its protrusion 34 into the female thread 28 at the axial end of the shrink-fit spindle 18.

The centering body 32 at its machine-side end comprises a central recess 40 having a female thread 41 to thus allow for screwing in a pressure line for feeding elastomeric material. An assigned pressure line for feeding elastomeric material that is screwed into the female thread 41 is shown in dashed lines with 43.

The central recess 40 is connected with the axial end of the gap 22 by means of a plurality of feeding channels 38. The feeding lines 38 are arranged at an end of the central recess 40 arranged circular and extend slanted to the outside into the direction of the end of the gap 22.

Preferably the damping element 42 consists of an elastomeric material, such as of polyurethane or of a rubber. Both materials in the non-vulcanized state can be advanced into the gap 22 under high pressure of several hundreds bars, usually in the range of about 500 bars or more, and can be vulcanized thereafter.

Figure 5:
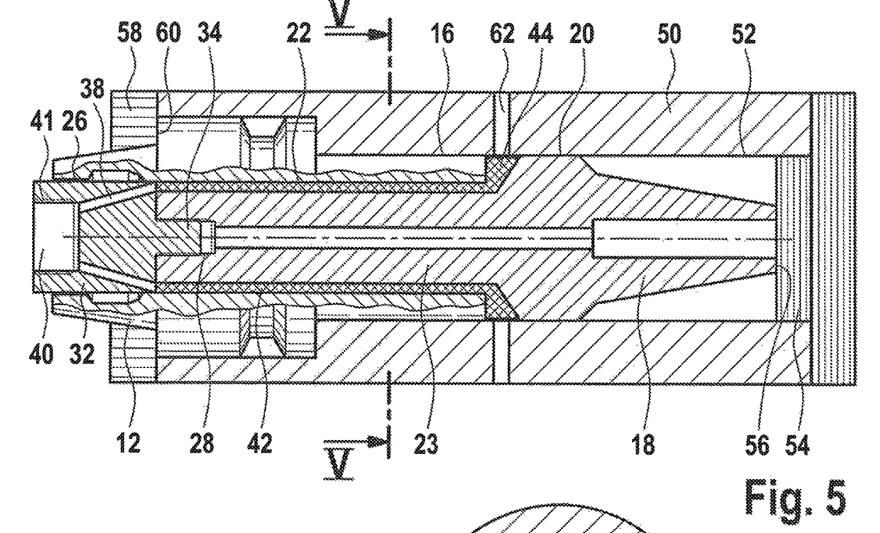
FIG. 5 a device shown in longitudinal section into which the base body and the clamping chuck are inserted to ensure a precise centering of both parts with respect to each other during the production of the damping element by means of an injection molding method.
Figure 6:
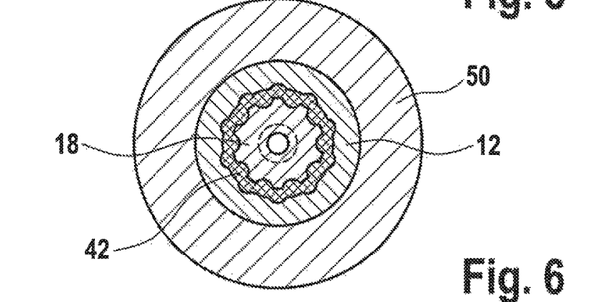
FIG. 6 a sectional representation through the device according to FIG. 5 along the line V-V.

Since the tool receptacle must have a high true-running precision and since the centering defects must be as small as possible between the base body 12 and the clamping chuck 18, it is suitable to effect the feeding of the elastomeric material into the gap 22 within a device suitable to this end. Such a device is shown in FIG. 5.

To this end a mold 50 is provided being configured as a massive tube having a central recess 52 being configured for inserting the base body 12 and the clamping chuck 18. The inner surface of the central recess 52 with its shape is mated to the outer surface of the base body 12 and the clamping chuck 18, respectively, and is respectively tightly tolerated, such as by a grinding method. Thus the base body 12 with its flange 14 is positioned at the inner surface of the recess 52 and in addition is precisely positioned by a resting of the centering truss 16 against the inner surface of the recess 52.

The clamping chuck 18 by means of resting of its centering truss 20 against the inner surface 52 is held centered.

Preferably there are axial stops for setting the axial position of the base body 12 and the clamping chuck 18 with respect to each other during feeding of the elastomeric material under pressure. To this end at the outer end of the clamping chuck 18 a stop 54 is provided serving as a stop for resting of the front surface 56 of the clamping chuck 18. At the opposite end of the mold 50 an axial stop 58 is provided that serves for axial resting of the base body 12 with its flange 14.

In addition in the mold 50 radial exhaust channels 62 are provided which extend from the outer region 44 of the gap 12 towards the outside.

Such a device allows for feeding elastomeric material via the pressure line 43 from the outside and directly via the feed channels 38 into the end of the gap 22. From hereon the material ends up under high pressure within the outer region 44 of the gap 22, until the latter is completely filled and the material possibly exits into the exhaust channels 32. This process occurs at a pressure which is usually in the range of about 500 bars or more and at an increased temperature of e.g. about 100° C.

For vulcanizing a short-time temperature increase, usually to more than 120° C., preferably to about 180° C. occurs.

The vulcanizing only takes a relatively short time which is below ten minutes, in most cases 4 to 6 minutes are sufficient.

Subsequently the tool receptacle 10 finally made in this way can be removed from the mold 50 and cooled. The centering body 32 will then be screwed out of the female thread 28, and excessive material is removed that protrudes from the outer region 44 of the gap 22 beyond the adjacent centering trusses 16, 20.

A tool receptacle 10 produced in this way has a very good true running precision and also has a highly effective vibration dampening due to the dampening element 42 which extends continuously within the complete annular gap 22 between the base body 12 and the clamping chuck 18.

Figure 7:
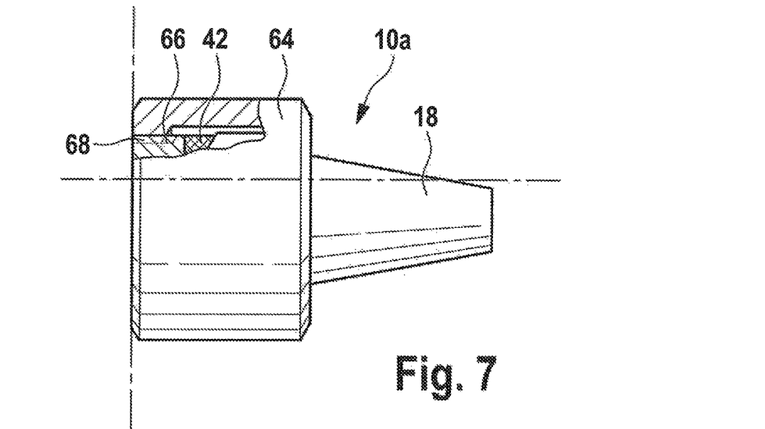
FIG. 7 a partially sectioned partial view of a slightly modified design of the tool receptacle, wherein this is shown only with the outer end with the clamping chuck and the sleeve nut.

FIG. 7 shows a modification of the tool receptacle that is designated in total with 10a. In FIG. 7 only the outer end of the clamping chuck 18 together with a sleeve nut 64 is shown that grips around the centering truss 20 from the outside and that can be screwed at the outer surface of the base body 12 with a male thread 68 into an assigned female thread 66.

Thus by the sleeve nut 64 an adjustable bias between the base body 12 and the clamping chuck 18 can be generated.

Figure 8:
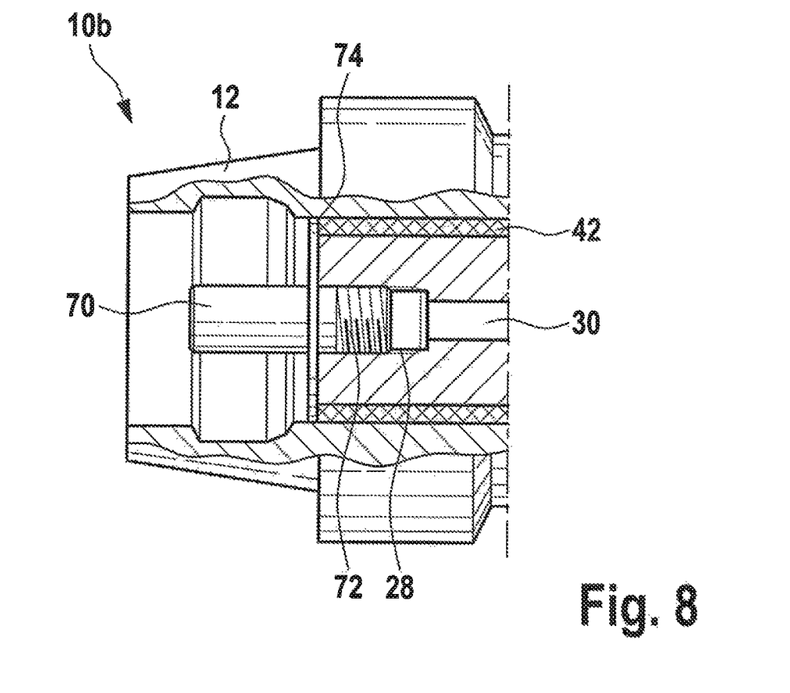
FIG. 8 a slightly modified embodiment of the tool receptacle shown in partial longitudinal section, wherein only the machine-side end is depicted.
Figure 9:
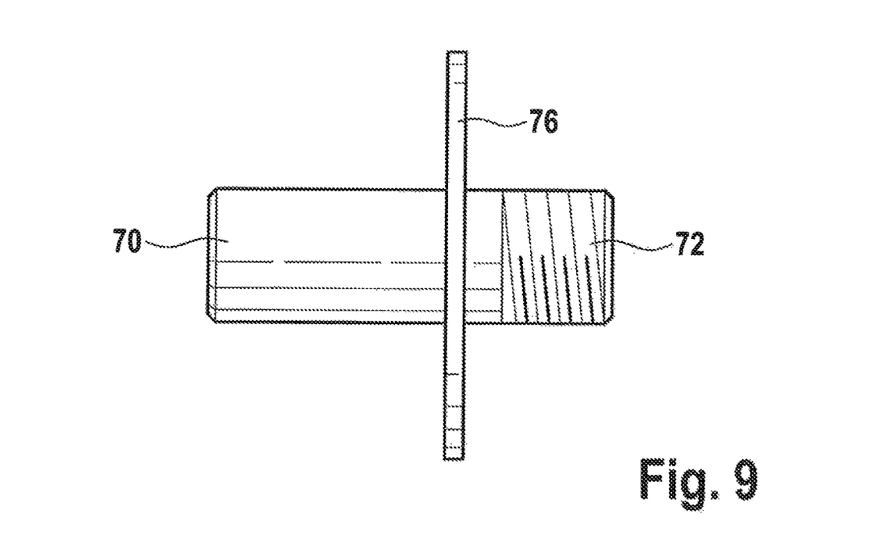
FIG. 9 a side elevation of the screw according to FIG. 8 in slightly enlarged representation.

In FIGS. 8 and 9 a further modification of the tool receptacle is shown and designated in total with numeral 10b.

In FIG. 8 only the machine-side end of the tool receptacle 10b is shown. The only modification with respect to the embodiment described above rests in the fact that a screw 70 is provided that is being-configured for feeding lubricant into the inner thread 28 for a minimum quantity lubrication, and in addition a disc 76 formed at the screw 70 rests against an axial end 74 of the damping element 42.

According to the prior art it is common and it is provided according to the pertinent DIN standard specification to provide a screw that can be screwed into the inner thread 28 for providing lubricant, to feed lubricant that is added from the machine-side via a central passage 28 of the base body 12 directly into the coolant agent channel 30.

Deviating from the DIN norm the screw 70 that is used herein according to FIG. 9 comprises a shoulder configured as a disc 76 that protrudes laterally and that rests against the axial end 74 of the damping element 42.

If in case of faulty operation during thermal shrinkage for clamping or de-clamping of tools within the holding section 23 of the shrink-fit chuck 18 a major thermal overload should be generated so that the maximum temperature of 180° C. is exceeded not only for a short time, but instead for a longer time a higher temperature of 200° C. or more is reached, then this may lead to a breakdown of the damping element 42.

To avoid in any event that in such a case the clamping chuck 18 can be released from the base body 12, the afore-mentioned screw 70 is used.

Figure 10:
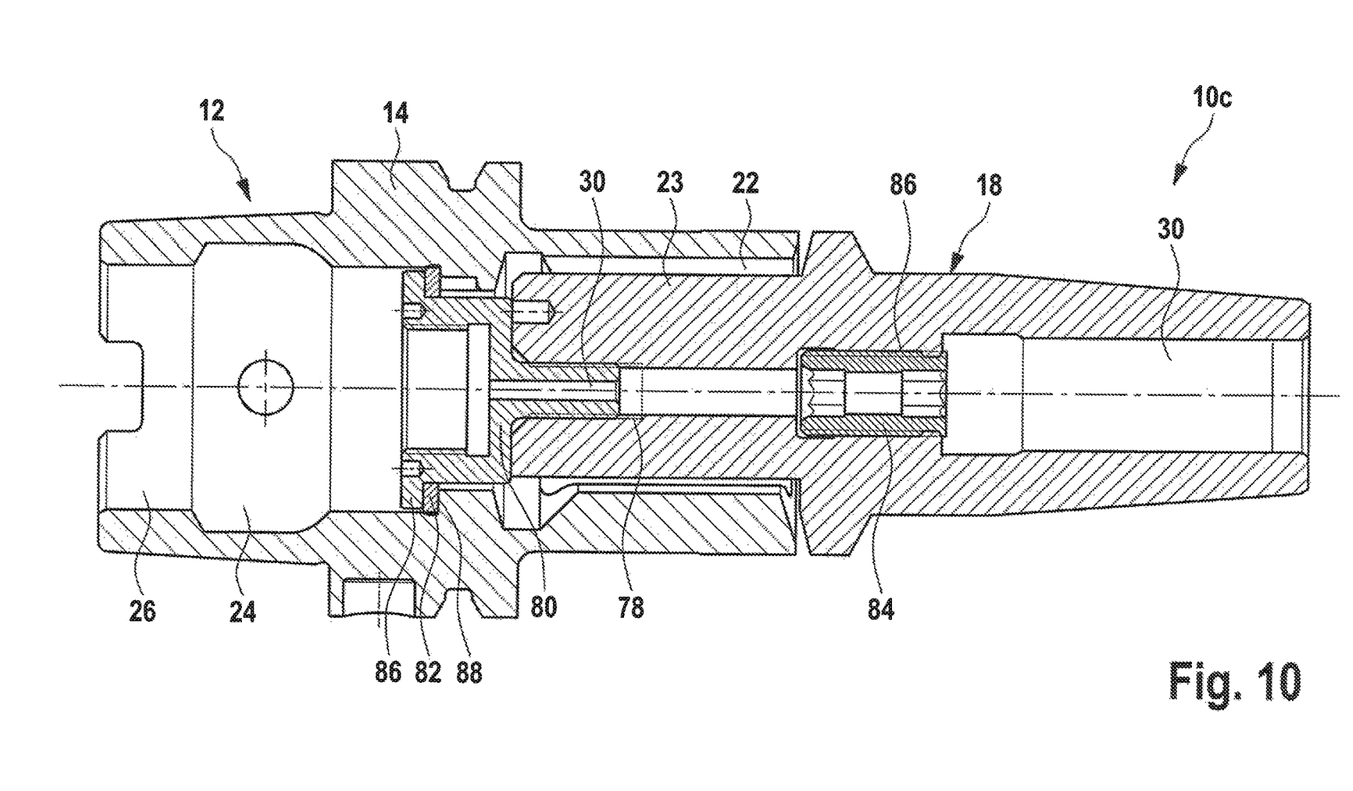
FIG. 10 a further modification of the embodiment according to FIG. 2, wherein between the clamping chuck and the base body there is provided a clamping screw complemented by an elastomeric disc, the hardness of which can be selected.

In FIG. 10 a modification of the tool receptacle according to FIG. 2 is depicted and designated in total with 10c. Herein for similar parts correspondent reference numerals are used. As with the embodiment according to FIG. 2 the tool receptacle 10c is shown with a gap 22 between the base body 12 and the clamping chuck 18 that is later filled with an elastic damping element.

Herein at the inner end of the holding section 23 of the clamping chuck 18 a threaded section 78 is provided into which a clamping screw 80 is screwed that is equipped with a central coolant agent channel 30 for a minimum quantity lubrication. The clamping screw 80 with its shoulder 86 rests against an elastomeric ring 82 which is biased against a shoulder 88 at the end of the central passage 24 of the base body 12. The hardness of the elastomeric ring 82 can be chosen selectively to ensure a particular bi-directional bias. In addition at the end of the receiving bore 30 an adjusting screw 84 is shown that can be adjusted within a threaded section 86 of the clamping chuck 18 for allowing a precise presetting of the axial end position for a tool shaft to be clamped, after having vulcanized the gap 22 with an elastomeric material.

What is claimed is:

1. A tool receptacle comprising:
   a base body having a first end for coupling with a drive spindle that can be driven rotatingly, and having a second end opposite said first end;
   a central bore extending through said base body;
   a clamping chuck for clamping a tool;
   a damping element made of an elastic material arranged between said base body and said clamping chuck, wherein said clamping chuck is solely connected to said base body by means of said damping element; and
   a first centering truss provided at said base body and a second centering truss provided at said clamping chuck,
   a holding section provided on said clamping chuck defining together with said central bore of said base body an annular gap running from an inner end facing said first end of said base body out into an outer gap between said first and second centering trusses, said damping element extending within said annular gap and said outer gap;
   said first and second centering trusses being precisely centered with respect to each other, so as to ensure centering said base body and said clamping chuck precisely with respect to each other within a surrounding mold during a molding and vulcanizing of said damping element.

2. The tool receptacle of claim 1, wherein said annular pap is a cylindrical gap, and wherein said damping element extends within the cylindrical gap between a holding section of said clamping chuck and said base body.

3. The tool receptacle of claim 1, wherein said damping element forms a positive connection with said base body and said clamping chuck.

4. The tool receptacle of claim 1, wherein said damping element consists of a polyurethane or a rubber material.

5. The tool receptacle of claim 1, wherein said clamping chuck is configured as a thermal shrink-fit chuck.

6. The tool receptacle of claim 1, further comprising a screw engaging an inner thread of said holding section for feeding lubricant from said drive spindle through said screw for a minimum quantity lubrication.

7. The tool receptacle of claim 6, wherein said screw further comprises a shoulder being configured for resting against an axial end of said damping element.

8. The tool receptacle of claim 6, wherein said screw comprises a disk being configured for resting against an axial end of said damping element.

9. The tool receptacle of claim 1, wherein said centering trusses provided at said base body and at said clamping chuck are both configured coaxially with respect to a longitudinal axis of said tool receptacle.

10. The tool receptacle of claim 1, wherein the centering truss of the base body and the centering truss of the clamping chuck are each precisely positionable against an inner surface of a central recess of the mold to precisely center the centering truss of the base body and the centering truss with respect to each other and to ensure centering of the base body and the clamping chuck with respect to each other before the elastic material of the damping element is formed in the mold.

11. A tool receptacle comprising:
   a base body having a first end for coupling with a drive spindle that can be driven rotatingly, and having a second end opposite said first end;
   a central bore extending through said base body;
   a clamping chuck for clamping a tool;
   a damping element made of an elastic material arranged between said base body and said clamping chuck, wherein said clamping chuck is solely connected to said base body by means of said damping element;
   a first centering truss provided at said base body and a second centering truss provided at said clamping chuck;
   a holding section provided on said clamping chuck defining together with said central bore of said base body an annular gap running from an inner end facing said first end of said base body out into an outer gap between said first and second centering trusses, said damping element extending within said annular gap and said outer gap;
   wherein said holding section on said inner end comprises inner threads being configured for receiving a centering body having an outer periphery that is centered within an inner surface of said base body at said first end of said base body opposite to said second truss;
   said first and second trusses and said centering body being precisely centered with respect to each other, so as to ensure centering said base body and said clamping chuck precisely with respect to each other within a surrounding mold during a molding and vulcanizing of said damping element.

* * * * *